Nov. 28, 1961 W. E. DICKINSON 3,011,061

DEVICE FOR IDENTIFYING CHARACTERS

Filed April 20, 1959 5 Sheets-Sheet 1

INVENTOR.
Wesley E. Dickinson

BY K. A. Fauchau

Nov. 28, 1961 W. E. DICKINSON 3,011,061

DEVICE FOR IDENTIFYING CHARACTERS

Filed April 20, 1959 5 Sheets-Sheet 2

INVENTOR.
Wesley E. Dickinson

BY K. A. Faucher

Nov. 28, 1961 W. E. DICKINSON 3,011,061

DEVICE FOR IDENTIFYING CHARACTERS

Filed April 20, 1959 5 Sheets-Sheet 3

INVENTOR.
Wesley E. Dickinson

BY [signature]

Nov. 28, 1961 W. E. DICKINSON 3,011,061

DEVICE FOR IDENTIFYING CHARACTERS

Filed April 20, 1959 5 Sheets-Sheet 4

INVENTOR.
Wesley E. Dickinson

BY

K. A. Fancher

Nov. 28, 1961 W. E. DICKINSON 3,011,061

DEVICE FOR IDENTIFYING CHARACTERS

Filed April 20, 1959 5 Sheets-Sheet 5

INVENTOR.
Wesley E. Dickinson

BY K. Afauchen

United States Patent Office 3,011,061

Patented Nov. 28, 1961

3,011,061

DEVICE FOR IDENTIFYING CHARACTERS

Wesley E. Dickinson, San Jose, Calif., assignor to International Business Machines Corporation, New York, N.Y., a corporation of New York Filed Apr. 20, 1959, Ser. No. 807,504
4 Claims. (Cl. 250—237)

The present invention relates to character identifying devices of the type which match a character to be identified in a field of radiant energy against a plurality of masks. In devices of this type the resultant variations in the amount of radiant energy passed by the masks are converted into electrical impulses that exhibit a maximum voltage change when the character to be identified is aligned with the proper mask. More particularly the present invention relates to devices, of the type referred to, wherein the character to be identified is viewed by one or several phototubes through a plurality of masks, one for each of the characters that may occur. In devices of this type the tube which views the character through the matching mask is subjected to a maximum change in the amount of light that it receives prior to, and during, registry with the character to be identified so that its output exhibits a maximum change as compared with the voltage changes encountered when other masks are interposed between the character and the same tube or other coordinated tubes that view the character through other nonmatching masks. In arrangements of this type the output of the tube exhibiting such a maximum change is arranged to actuate character identifying signals and/or control the operation of machinery, such as accounting machines, in a manner peculiar to the identified character.

The difficulty with known devices of this type is that they require accurate placement of the characters on the record, so as to be reliable in operation. In practice, however, printing devices print the characters sometimes slightly out of position, either in a horizontal or in a vertical direction. Hence, when a sheet bearing characters to be identified is transported past a character identifying device, of the type referred to, and some of the characters are either positioned slightly too high or slightly too low, these characters may never reach a position of complete alignment with their identifying masks, with the result that the device may fail to identify them or may even supply erroneous identifications. In this respect, irregularities in the vertical position of the characters, i.e., irregularities in the position of the characters in a direction perpendicular to the direction of movement of the character-bearing sheet or tape past the identifying devices, are particularly troublesome since vertically mislocated horizontal components of a character to be identified may never even approach a position of partial coincidence with the corresponding component of its identifying mask during travel of the character past the identifying device, while horizontally mislocated vertical components of the character are bound to pass sooner or later through a position of at least partial coincidence with the corresponding components of the mask.

It is an object of my invention to provide a character identifying device, of the type referred to, that will properly identify characters irrespective of small irregularities in their position.

More particularly, it is an object of my invention to provide a character identifying device, of the type referred to, that will properly identify characters irrespective of significant mislocation of the characters in a direction perpendicular to the path of movement of the character-bearing sheet or tape relative to the identifying device.

In particular, it is an object of my invention to provide position-tolerant optical masks, for character-identifying devices of the type referred to, i.e., masks that may be matched sufficiently with the characters which they are to identify, to produce an identifying response in the circuitry of devices, of the type here under consideration, even if the character to be identified is markedly mislocated in a direction perpendicular to the direction of relative movement between the character-bearing sheet or tape and the identifying device.

Still another object of my invention is to provide a position-tolerant character identifying arrangement, of the type referred to, that is of simple construction and low in cost.

These and other objects of the present invention will be apparent from the following description of the accompanying drawings which illustrate a preferred embodiment thereof and wherein, FIGS. 1 to 10 show the characters 1 to 9 and 0 respectively, and illustrate below each character an identifying mask, for said character, that is constructed in accordance with my invention;

In accordance with my invention I employ identifying masks wherein the components or segments corresponding to the vertical components of the characters to be identified are substantially extended vertically, for instance, to about twice the length of the corresponding components in the characters to be identified, and wherein the components of the masks corresponding to horizontal components of the characters are either completely omitted or are substantially increased in (vertical) width while their transparency or opacity, depending on the nature of the mask, is reduced so that the total light transmission of the vertically expanded horizontal component of the mask may be equal to or even less than the light transmission that would have been provided by the component if it equaled in form and size the corresponding component of the character to be identified. In this manner I provide a reliably operating character-identifying device, of the type referred to, that is insensitive to significant mislocations of the characters to be identified, in a vertical direction.

FIGS. 1 to 10 illustrate the characters 1 to 9 and 0, respectively, in forms that lend themselves readily for identification in accordance with my invention, and above each character is shown a mask $M_1$ to $M_0$, respectively, constructed in accordance with my invention to identify the character irrespective of substantial variations in its vertical position. In said figures the contours 20 designate an opaque sheet of metal, cardboard, plastic, paper and the like, in which areas corresponding to the characters indicated above have been left transparent or translucent, or have been cut out to enable them to transmit light. Masks of this type are intended for cooperation with an external source of light that is passed through, or reflected from, the sheet or tape which carries the characters to be identified, and whenever the change in the transmission of light through the mask effected by registry of any one of the characters 0 to 9 is at a maximum, i.e., if the mask with a character aligned in front of it passes a minimum of light, it identifies the particular character as the character for whose identification it was designed.

Figure 3:
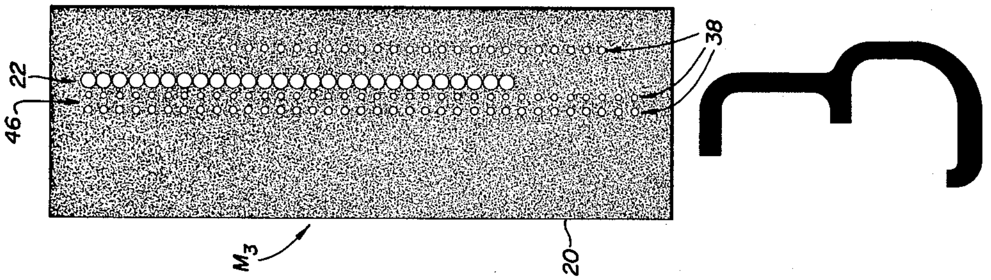
Figure 2:
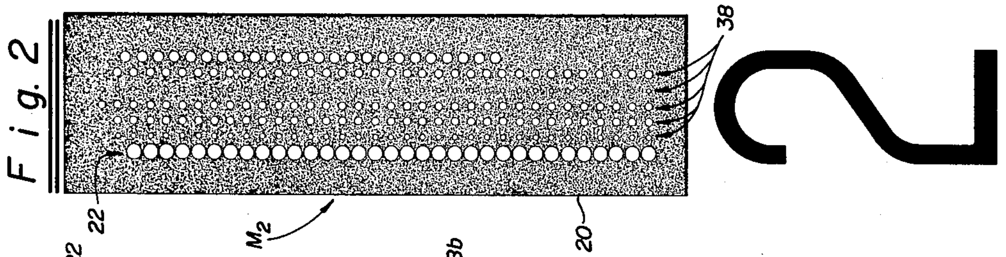
Figure 4:
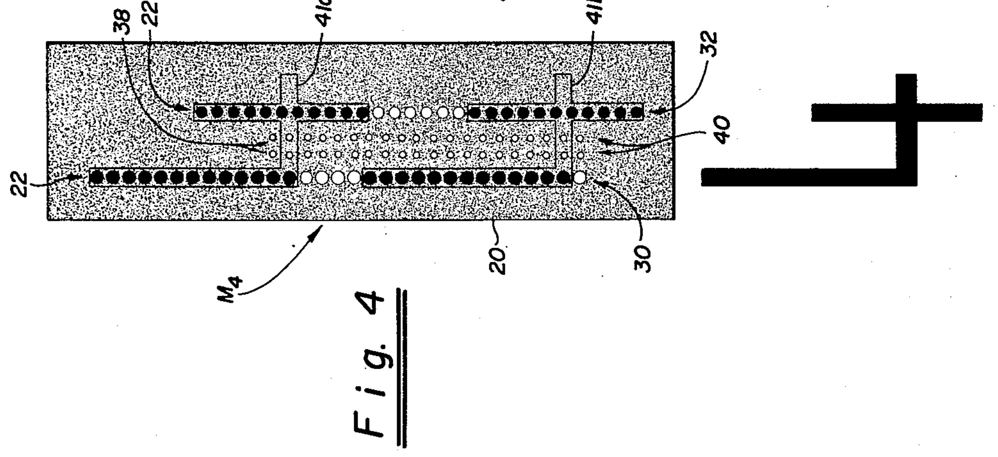

In the masks illustrated in FIGS. 1 to 10, the components corresponding to the vertical components of characters are established by vertical rows of circular holes 22 of relatively large diameter, and said rows are about twice the vertical length of the character components which they represent, as best shown by the rows 24 and 26 of the masks for the identification of the character "0" (FIG. 10), the double row 28*a*, 28*b* in the mask for the identification of the character "1" (FIG. 1) or the rows 30 and 32 in the mask for the identification of the character "4" (FIG. 4). In said masks the components corresponding to horizontal components of the characters which they are to identify are either completely omitted as at 34 and 36 in the mask for identifying the character "0" (FIG. 10), or they are represented by vertically extended areas of holes 38 of a substantially smaller size than the holes that establish the vertical components of the masks, as indicated for instance at 40 in the mask that serves to identify the character "4" (FIG. 4).

In extending the vertical components of the mask to establish a tolerance for vertical mislocation of the characters to be identified, care should be taken, however, that said vertical mask components be not extended above or below the level of the highest or lowest point, respectively, that the corresponding components of displaced characters may reach. Thus, for instance, the upper end of the component 32 in the mask illustrated in FIG. 4 (which component corresponds to the center bar of the character "4") is located a distance below the highest point of the parallel component 30 which corresponds to the left side bar of character 4, and vice versa the lowest point of the component 30 is located a distance above the lowest point of the component 32, corresponding to the extreme positions of vertical displacement which the character "4" may assume as illustrated at 4*a* and 4*b* in FIG. 4. Similarly, the right component 42 of the mask illustrated in FIG. 6, which corresponds to the right vertical bar of the character "6," terminates at its upper end a substantial distance below the upper end of the left vertical component 44 of the mask, which corresponds to the left vertical bar of the character "6," but the lower ends of both components 42 and 44 are disposed at the same level, because the lower ends of both said bars are usually located at about the same level in the character "6.". In this manner I limit the open areas left in the mask, even after a complete registry with the proper character has been achieved, to the absolute minimum necessary to establish the desired tolerance of the masks for vertical displacements of the character that they are to identify, and yet preserve a maximum percentage change in the light passed through the mask when it is entirely open and after registry with the proper character has been established, whether said character is vertically displaced or not. Provision for such a maximum percentage change in the light passed (or obstructed) by the mask before and during registration with the proper character for whose identification a particular mask is designed aids in producing a sufficiently strong response in the radiant-energy sensitive device upon which the radiant energy is projected from the character to be identified through the identifying masks, to obtain maximum discrimination against the responses obtained when the particular character is checked against the remaining masks of the device.

Figure 1:
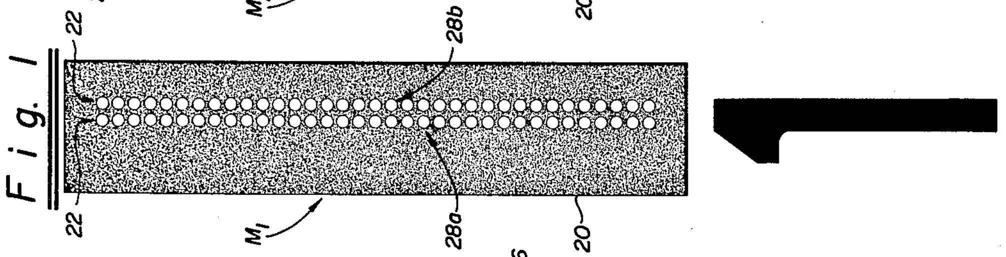
Figure 10:
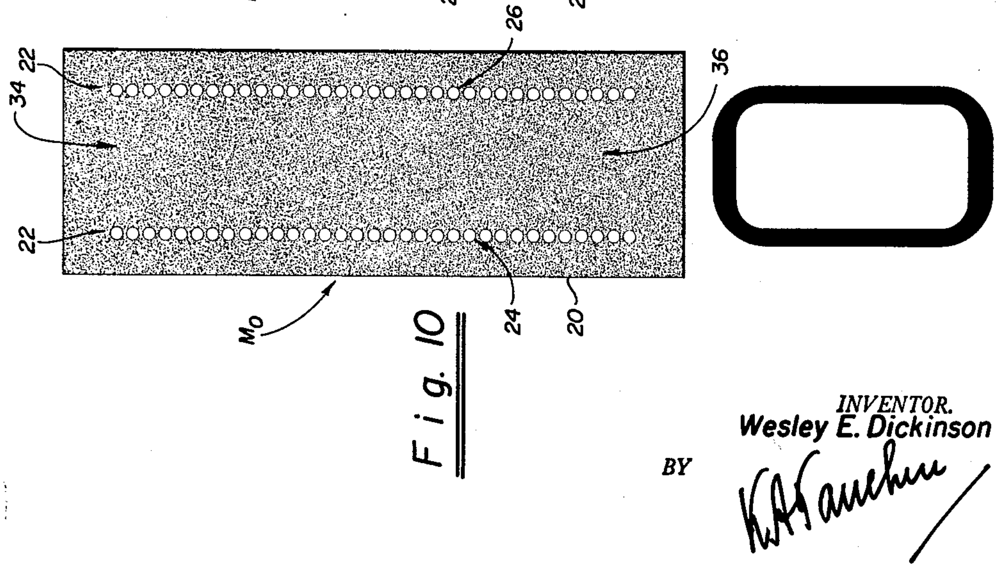

To avoid that the mask for the character 1, which comprises basically a single vertical transparent bar, may produce an improper identifying response in that phototube with which it is associated, when a character passes said mask that includes a vertical bar, such as the characters 0, 6 or 9, I accentuate the thickness of the character 1 in the font of characters employed in accordance with my invention (FIG. 1), and I increase the thickness of the open or transparent area in the mask correspondingly as illustrated in FIG. 1, wherein the light transmitting area of the mask is formed by two closely adjacent parallel vertical rows of holes 28*a* and 28*b* as previously pointed out. Thus, the vertical bars of characters, such as 0, 6 and 9, which are significantly thinner than the area covered by the rows 28*a* and 28*b*, are unable to obstruct this area to an extent wherein the phototube behind the mask for the character "1" produces an erroneous identifying response.

Figure 6:
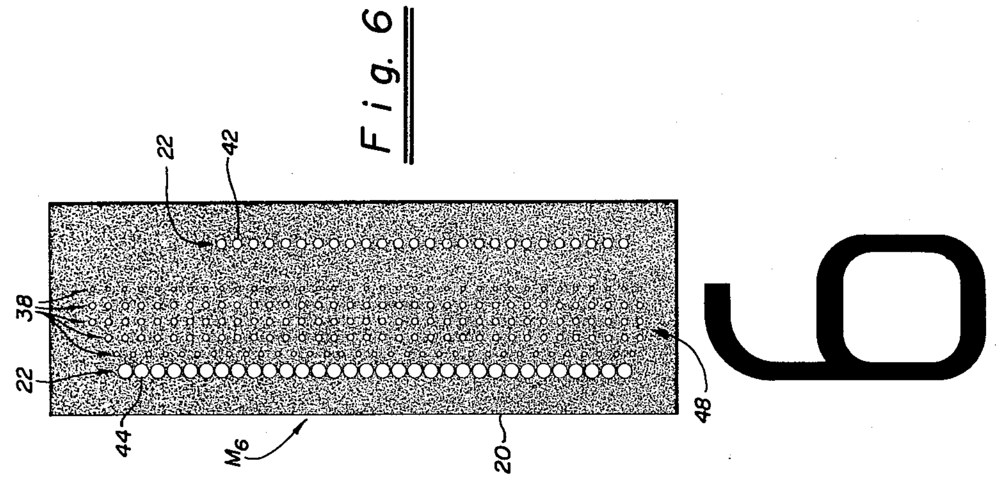
Figure 5:
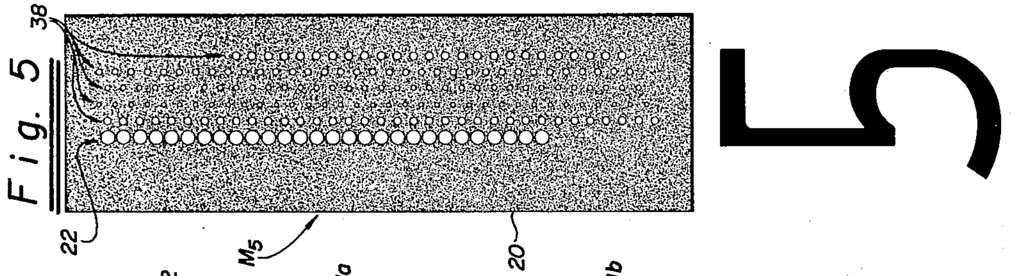
Figures 7, 8, 9:
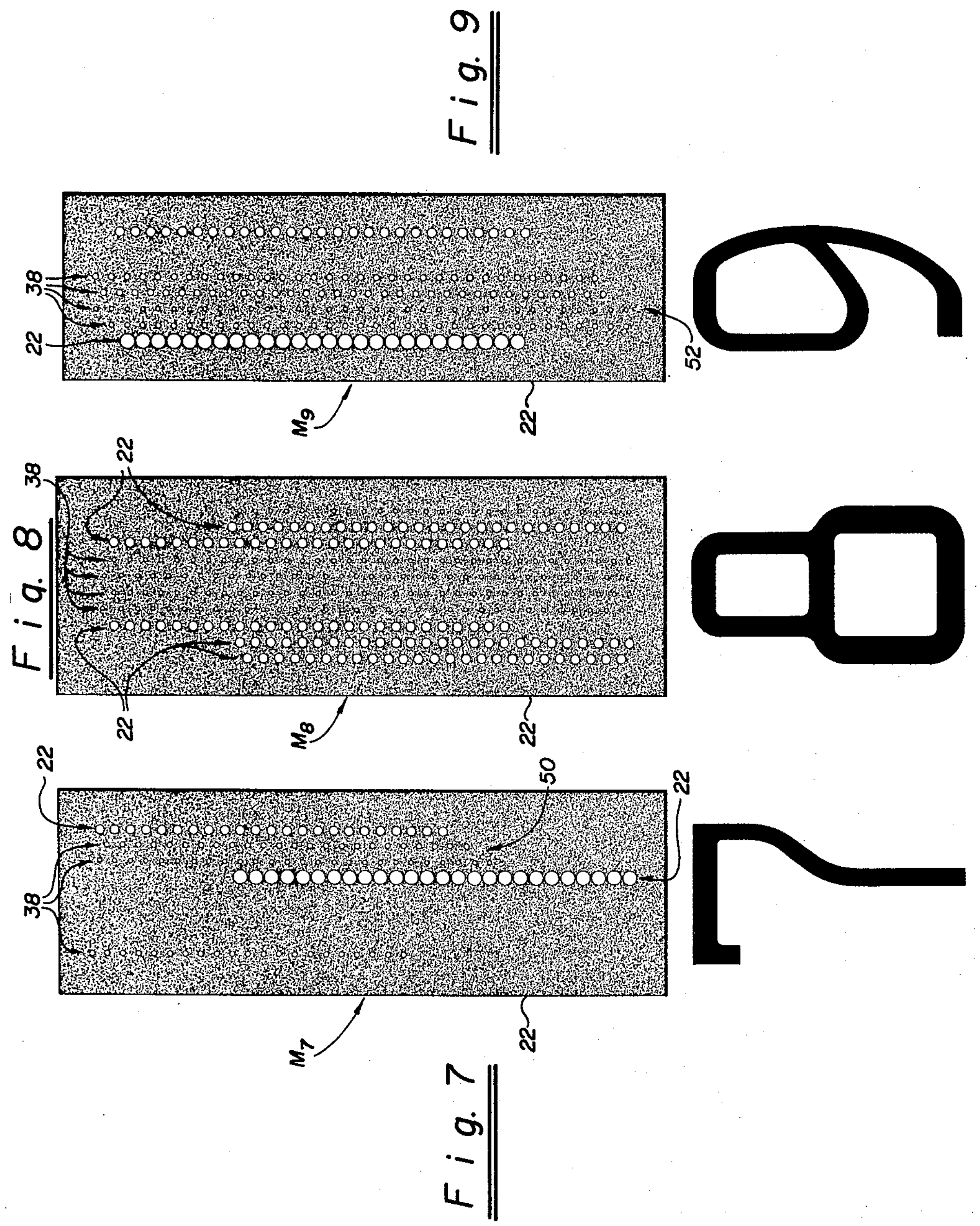

Reverting to the components of the mask that correspond to the horizontal segments of the characters which they are intended to identify, in the case of characters having several superposed horizontally extending segments, such as for instance the characters 2, 3, 5, 6, 8 and 9, the vertical expansion of the corresponding mask areas may cause them to fuse into a single column of small holes 38 as, for instance, at 46 in FIG. 3, at 48 in FIG. 6, at 50 in FIG. 7, and at 52 in FIG. 9, and, depending on the particular conformation of these horizontal character segments, the density, size and distribution of the holes 38 that establish these columns may be graded, as best apparent from FIGS. 3, 4, 6 and 8.

Figure 11:
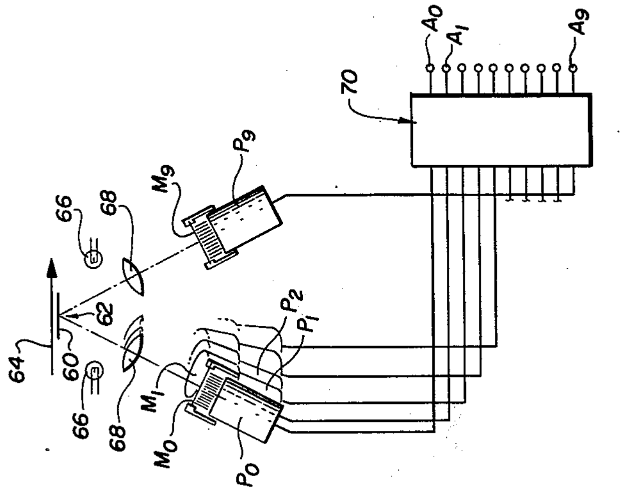
FIG. 11 illustrates schematically a complete character-identifying arrangement embodying the principles of my invention.

FIG. 11 illustrates a practical character-identifying arrangement wherein the masks of my invention are employed. Said arrangement views each character to be identified simultaneously through all available masks. For this purpose it comprises an array of phototubes $P_0$ to $P_9$ arranged in equi-spaced relation along a conical plane, each provided with one of the masks available for identification i.e., masks $M_0$ to $M_9$. In FIG. 11 only a few of the phototubes and the masks associated therewith are shown for reasons of clarity. The card, sheet or tape 60 bearing the characters to be identified is moved through the apex 62 of said conical plane by any well known means symbolically represented by the arrow 64. The area around said peak is uniformly illuminated by an array of electric lamps indicated at 66, and interposed between the point 62 and the various phototubes are lenses 68 to focus the character on the tape or card at said point 62 onto the masks $M_0$ to $M_9$. In each of the phototubes the illuminated character at point 62 will produce a response depending on the degree to which the dark area on the card established by said character may reduce the illumination provided by the apertures of its associated mask. In the particular mask corresponding to the character at point 62, however, said character reduces the light permeability to a markedly greater degree than in the other masks irrespective of misalignment of said character in vertical direction, and as a result the tube behind said mask registers the greatest change in its response at the time the character to be identified is viewed by all said tubes. The outputs of all the tubes are simultaneously delivered to a voltage comparing system symbolically represented by the block 70. This system identifies the tube that registers the greatest change in response either by a visible or an audible signal and in this manner identifies the character at point 62, or it may actuate control mechanism for machinery, such as accounting machines, in a manner that is characteristic for the tube which registers the greatest change in response and thus is characteristic for the character that is at the moment located at point 62.

Phototube systems and voltage comparing circuitry of the type employed in the arrangement illustrated in FIG. 11 are well known in the art and do not form a novel part of my invention. For the sake of completeness, however, FIG. 12 shows details of a circuit arrangement such as may be employed in the system illustrated in FIG. 11.

Figure 12:
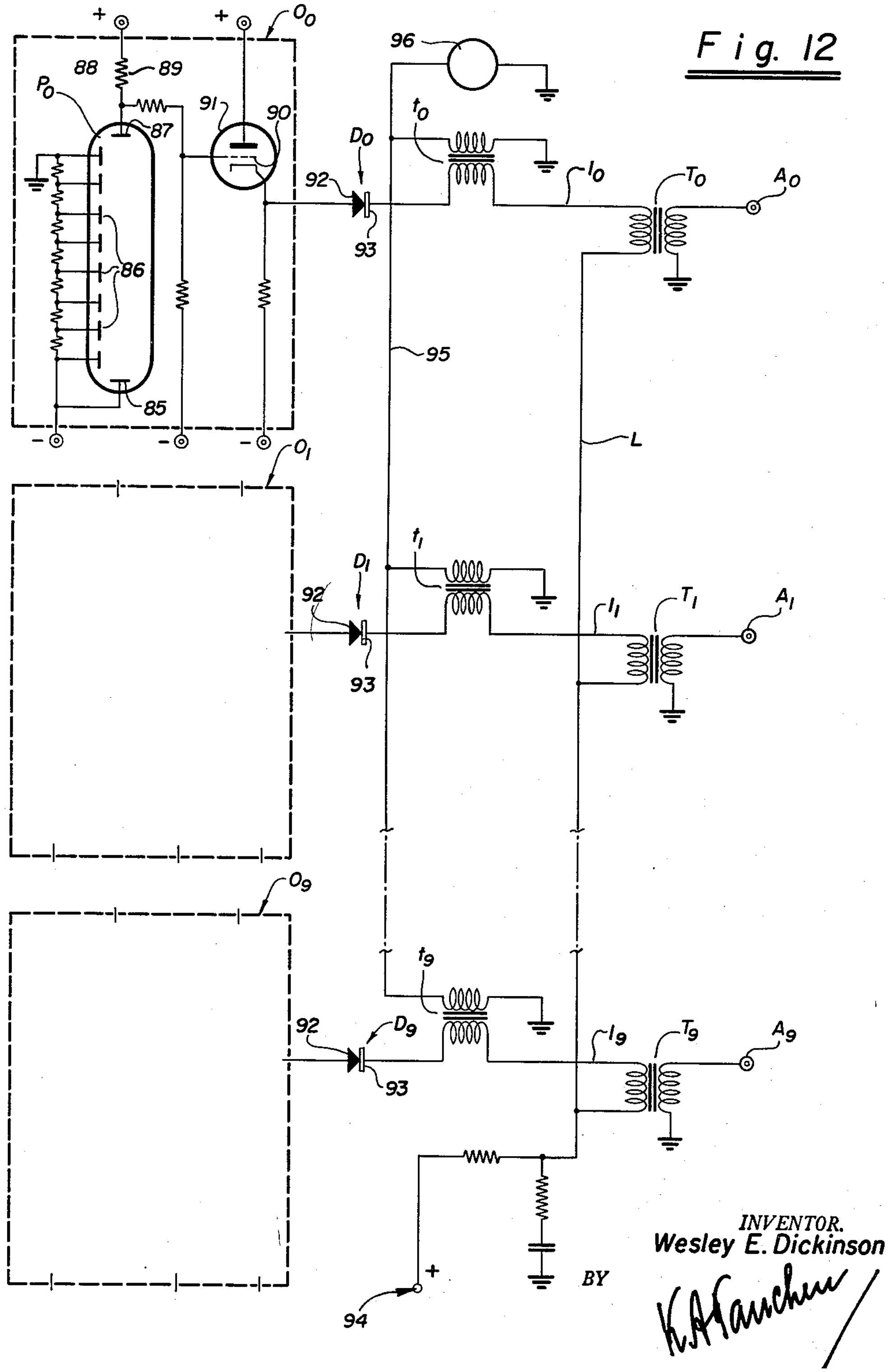
FIG. 12 is a diagram illustrating a phototube circuit and voltage comparing circuitry, such as may be employed in the arrangement of FIG. 11.

In FIG. 12 the letter $P_0$ indicates one of the ten photomultiplier tubes comprised in the system shown in FIG. 11. Light impinging upon its cathode 85 produces an emission of electrodes that is multiplied by the dynodes 86 and which produces an increased current flow at the anode 87 of the tube. Connected in series with the anode of the phototube $P_0$ is a resistor 89 of constant value. The voltage at point 88 between the constant resistor 89 and the phototube $P_0$ drops whenever the cathode 85 of the phototube receives light and the current flow at the anode thereof increases. With no character in front of the mask $M_0$ associated with the tube $P_0$, in which condition the cathode of the tube $P_0$ receives a maximum of light, the voltage supplied to the grid 90 of the cathode follower tube 91 is therefore at a minimum. With the proper character in alignment with the mask $M_0$, the voltage delivered to the grid of the cathode follower tube is at a maximum, and with a nonmatching character located before the mask $M_0$, the voltage delivered to the grid of the cathode follower tube is at an intermediate value. In FIG. 12 a portion of the remaining photomultiplier tubes $P_1$ to $P_9$ and their associated cathode follower tubes have been represented by the blocks $O_1$ and $O_9$.

With no character at the identification point 62, the output voltages supplied by the cathode follower stages comprised in the system are all about equally low, and each is applied to the anode 92 of a diode $D_0$ to $D_9$, respectively. The cathodes 93 of all said diodes are biased in such a manner that current flow through said diodes is blocked until the voltage applied to their anodes rises above a critical voltage. The bias is established from point 94 through a common line L to which the cathodes of the diodes $D_0$ to $D_9$ are connected by branch lines $l_0$ to $l_9$, respectively. Each of said branch lines contains the secondary winding of a transformer $t_0$ to $t_9$, respectively, whose primary winding is connected to the output line 95 of an audio oscillator 96 which may generate a frequency of, say, 20,000 cycles. Each of the lines $l_0$ to $l_9$ contains also the primary winding of another transformer $T_0$ to $T_9$, respectively, whose secondary winding may be arranged to operate a device for producing an identifying signal, as indicated by the circles $A_0$ to $A_9$. With the lines $l_0$ to $l_9$ in a nonconducting state, due to the bias applied to the cathodes 93 of the diodes $D_0$ to $D_9$, no signal can be delivered from the oscillator to any of the transformers $T_0$ to $T_9$. However, when one of the output voltages of the phototube systems $O_0$ to $O_9$ rises above the bias applied to the cathodes of the diodes $D_0$ to $D_9$, indicating that its particular photomultiplier tube receives a minimum of light due to the fact that a maximum portion of the open space of its associated mask is blotted out by a matching character, current begins to flow through the line 1 associated with said particular phototube system, and delivers the oscillations produced by the oscillator 96 to its associated transformer T causing the secondary winding of said transformer to produce an output that energizes the proper signal-producing device A.

Figure 13:
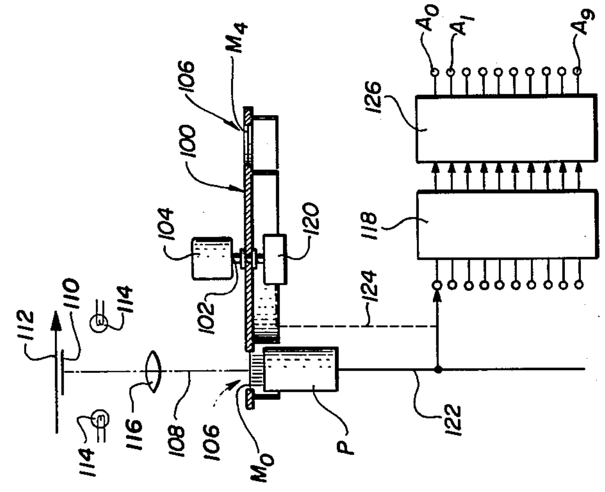
FIG. 13 illustrates schematically a modified character-identifying arrangement embodying the principles of my invention.

While the above described character-identifying system operates on the principle of viewing the character to be identified simultaneously through all available masks and therefore requires as many phototubes as there are characters in the font of characters employed, the system illustrated in FIG. 13 operates on the principle of viewing the character to be identified with a single phototube consecutively through the available masks, storing the responses thus obtained and comparing these responses after the character has been viewed through every one of these masks, to determine which mask produced a minimum change in the response of the tube. In FIG. 13 the reference numeral 100 indicates a circular disc or wheel which may be of metal and which is mounted upon the output shaft 102 of a motor 104 for rotation therewith. In its peripheral area said disc 100 is provided with ten equi-spaced windows 106 into which are fitted the hereinbefore described masks $M_0$ to $M_9$ illustrated in FIGS. 1 to 10. A phototube P is located below said peripheral area of the disc 100 at a predetermined point of its rotary path indicated by the line 108.

The card 110 upon which are marked the characters that are to be identified is conducted intermittently through said point by any well known card transporting means symbolically represented by the arrow 112, and as it passes through said point, its character-bearing surface is uniformly illuminated by an array of electric lamps indicated at 114. A lens 116 is interposed between the card and the disc 100 to focus any character marked on the card at line 108 onto whatever mask $M_0$ to $M_9$ is in position between the card and the phototube at the moment. Operation of the motor 104 insures that every one of the ten masks carried by the disc is placed in rapid succession into the path of the light reflected from the card onto the phototube. One of the ten masks will correspond to the character positioned at the identification point at the moment, but the others will not. When the proper mask has moved into the path of light between the card and the phototube, the dark, light-absorbing area of the character will coincide with the open light-transmitting area of the mask as much as this is possible in the position-tolerant masks of my invention, irrespective of whether the character on the tape is in a properly centered position or whether it is vertically displaced in one or the other direction. This means that the largest possible portion of the open area of the mask is effectively covered up and a minimum of light reaches the phototube behind the mask so that the phototube registers a maximum change in its response at the moment. In the case of all other masks the open areas of said masks will be covered to a much lesser degree because the shape of their open areas does not correspond to the character that is located in the identification line 98 at the moment. Hence, with each of the other masks in testing position, the phototube receives a markedly greater amount of light and as a result thereof exhibits a considerably smaller change in its response. The voltages successively developed by the phototube system as the ten different masks are consecutively placed into position between the character and the phototube may be successively stored on ten different capacitors of a voltage storage device schematically represented by the block 118. This is accomplished by a commutator, represented by the block 120, that is mounted upon the motor shaft 102 and turns in unison with the mask-supporting disc 100 and which connects the output line 122 of the phototube system sequentially to the voltage storage condenser that corresponds to the mask which the disc moves into position before the phototube P, as symbolically indicated by the broken line 124. After every one of the condensers in the voltage storage device has received a charge, well known circuitry identified by the block 126 operates to compare these charges and causes the minimum or maximum charge, as the case may be, to energize mechanism $A_0$ to $A_9$, respectively, which identifies the mask that restricted the supply of light to a minimum. This in turn identifies the character on the card on line 108 at the moment. The voltage comparing device may be arranged to operate machinery in accordance with the value of the character represented by the mask that reduced the illumination of the phototube to a minimum.

In the exemplary arrangement described above and illustrated in FIGS. 11 and 13, it is the minimum illumination received by one of several phototubes through the masks of my invention which is employed to identify a character or to control machinery in accordance with the meaning of the character to be identified. This is because the characters to be identified are presumed to be marked as opaque or nearly opaque areas upon a lighter background, and are illuminated from an external source of light; and the masks employed to identify them are masks that have light permeable areas of a conformation corresponding in some manner to the character to be identified, against an opaque or nearly obaque background. It will be understood by those skilled in the art, however, that maximum illumination of the phototube or tubes may be employed to identify a character through the illustrated masks in those cases where the characters to be identified are written or printed in luminescent ink and require no external illumination. However, even if the characters are printed or written in luminescent ink, minimum illumination of a phototube will have to be employed to identify a character when masks are used wherein the areas of the masks corresponding to components of the characters to be identified are opaque areas on a transparent or translucent background.

While I have explained my invention with the aid of certain embodiments thereof, it will be understood that the invention is not limited to the specific masks shown and described by way of example, nor to the specific circuit arrangements illustrated diagrammatically, all of which may be departed from without departing from the scope and spirit of my invention.

What is claimed is:

1. For a character-identifying system of the type wherein the characters to be identified are moved relative to and into registry with a plurality of identifying masks, each having areas of predetermined light permeability of a conformation corresponding to a particular character, and wherein light is directed at said point of registry from each character to be identified through said masks onto a light sensitive element adapted to convert changes in its illumination into identifying current impulses, a position tolerant mask construction comprising first areas corresponding to vertical components of the character of a thickness about equal to the thickness of the vertical character components in a direction longitudinally of the relative movement of character and mask but substantially extended in length in a direction perpendicular to said direction of movement, and second areas corresponding to horizontal character components about equal in width to the width of said horizontal character components in said direction of movement but substantially expanded in depth in a direction perpendicular to said direction of relative movement, said last mentioned areas being of a different light permeabilty than said first mentioned areas.

2. A mask construction according to claim 1 wherein said first areas are formed by circles of predetermined light permeability and size, and said second areas are formed by circles of different size.

3. A mask construction according to claim 1 wherein said mask is formed by an opaque sheet, said first areas are formed by circular holes of a predetermined size, and said second areas are formed by circular holes of smaller size.

4. A mask construction according to claim 1 wherein the upper and lower ends of said areas are located on the same level as the extreme upper and lower points which the upper and lower ends, respectively, of their corresponding character components may reach due to irregularities in the position of said characters in a direction perpendicular to said direction of relative movement between characters and masks.

References Cited in the file of this patent

UNITED STATES PATENTS

| | | |
|---|---|---|
| 2,285,296 | Maul | June 2, 1942 |
| 2,362,004 | Heidinger | Nov. 7, 1944 |
| 2,616,983 | Zworykin et al. | Nov. 4, 1952 |
| 2,663,758 | Shepard | Dec. 22, 1953 |
| 2,682,043 | Fitch | June 22, 1954 |